US012580753B2

(12) United States Patent
Wingert

(10) Patent No.: US 12,580,753 B2
(45) Date of Patent: Mar. 17, 2026

(54) METHOD FOR GENERATING AT LEAST ONE CRYPTOGRAPHIC KEY AS WELL AS A COMPUTER PROGRAM PRODUCT AND A DEVICE THEREFOR

(71) Applicant: TrustNXT GmbH, Hamburg (DE)

(72) Inventor: Julian Wingert, Pinneberg (DE)

(73) Assignee: TrustNXT GmbH, Hamburg (DE)

( * ) Notice: Subject to any disclaimer, the term of this patent is extended or adjusted under 35 U.S.C. 154(b) by 63 days.

(21) Appl. No.: 18/627,166

(22) Filed: Apr. 4, 2024

(65) Prior Publication Data

US 2024/0340173 A1 Oct. 10, 2024

(30) Foreign Application Priority Data

Apr. 5, 2023 (DE) .......................... 102023108680.4

(51) Int. Cl.
*H04L 9/08* (2006.01)
*G06K 7/10* (2006.01)
*G06K 7/14* (2006.01)
*H04L 9/32* (2006.01)

(52) U.S. Cl.
CPC ........ *H04L 9/0861* (2013.01); *G06K 7/10722* (2013.01); *G06K 7/1417* (2013.01); *H04L 9/3247* (2013.01)

(58) Field of Classification Search
CPC ... H04L 9/3247; H04L 9/0869; H04L 9/0861; H04L 9/0866; G06K 7/10722; G06K 7/1417
See application file for complete search history.

(56) References Cited

U.S. PATENT DOCUMENTS

| | | | | |
|---|---|---|---|---|
| 7,129,973 | B2 * | 10/2006 | Raynor .............. | H04N 1/32128 |
| | | | | 348/231.3 |
| 12,244,686 | B2 * | 3/2025 | Koo ....................... | H04L 9/0618 |
| 2003/0161475 | A1 | 8/2003 | Crumly et al. | |
| 2019/0349204 | A1 * | 11/2019 | Enke ..................... | G06F 21/602 |
| 2019/0373195 | A1 * | 12/2019 | Minagawa ............. | H04N 25/78 |
| 2020/0029069 | A1 * | 1/2020 | Goergen ............... | A63G 31/00 |
| 2020/0357754 | A1 * | 11/2020 | Toyoshima ........... | H10F 39/182 |
| 2021/0127080 | A1 * | 4/2021 | Okura .................... | H04N 25/76 |
| 2021/0157898 | A1 * | 5/2021 | Goel ....................... | G06F 21/45 |
| 2022/0357390 | A1 * | 11/2022 | Hung ............. | G01R 31/318357 |
| 2022/0385849 | A1 | 12/2022 | Sawada | |

OTHER PUBLICATIONS

Puglisi et al., "Random Telegraph Noise: Measurement, Data Analysis, and Interpretation," 2017 IEEE 24th International Symposium on the Physical and Failure Analysis of Integrated Circuits (IPFA), Chengdu, China, Jul. 4-7, 2017. (9 pages).

* cited by examiner

*Primary Examiner* — Mohammad A Siddiqi
(74) *Attorney, Agent, or Firm* — Seed Intellectual Property Law Group LLP

(57) ABSTRACT

A method for generating at least one cryptographic key includes taking a plurality of images with an image sensor, in particular, a CMOS image sensor, capturing pixels of the image sensor in at least one section or area of the image sensor which have a predefined error depending on the images taken and determining at least one cryptographic key depending on the captured pixels, that have the error, wherein the predefined error corresponds to a random telegraph noise error.

19 Claims, 2 Drawing Sheets

METHOD FOR GENERATING AT LEAST ONE CRYPTOGRAPHIC KEY AS WELL AS A COMPUTER PROGRAM PRODUCT AND A DEVICE THEREFOR

BACKGROUND

Technical Field

Embodiments of the invention relate to a method for generating a cryptographic key, i.e., a key that can be used in cryptology to encrypt and/or digitally sign data. In addition, embodiments of the invention relate to a device for generating at least one cryptographic key as well as a computer program product for carrying out the method, in particular, on the device.

Description of the Related Art

It is generally known from the prior art to encrypt or digitally sign data using a cryptographic algorithm, wherein the cryptographic algorithm is parameterized by a cryptographic key, thereby controlling it.

In cryptography, symmetric methods are known in which a key corresponds to a password. The password can be used to convert plain data, such as a plain text for example, into secret data, such as a ciphertext, using an algorithm that uses the password. The plain data can then also be obtained from the secret data using the same password.

There are also known asymmetric methods in which two keys of a key pair, namely a private key and a public key as a rule, are used to encrypt the data with one key of the key pair and decrypt it using the other key of the key pair.

Cryptographic keys, in particular, a key used for a symmetric encryption method, or a private key used for an asymmetric encryption method, must be kept secret and should not be publicly known in order to protect the encrypted data, such as secret data for example.

Depending on the complexity of the cryptographic key, it is possible that a person who wants to use a simple key will generate it for themselves and remember it so that the key can be indicated by the person for encryption in a device if necessary. Such a simple key can be passed by the person to trusted other people, if necessary, for example, if it is a password for a symmetric method. However, such simple keys have a low level of security due to their limitation of the number of characters in a string that a person is capable of remembering, and often do not meet the security requirements for certain use cases by today's standards.

For this reason, more complex keys are usually used today in the form of a long string of characters, which can be assigned to a user by a certificate authority, for example, or chosen once by the user himself/herself. Such complex keys are stored in a device that a user can use to digitally sign, encrypt, or decrypt data and are read from the memory-storage system by applications running a cryptographic algorithm when required.

In some cases, devices provide storage areas for such keys, which are particularly protected against being read by unauthorized persons. This ensures that the secret keys cannot be used by unauthorized persons to digitally sign, encrypt or decrypt data. However, protecting memory-storage system against being externally read out is very time-consuming in such a way that no where near all devices provide for such a memory-storage system. Even in the presence of such a memory-storage system, and particularly in the case where an ordinary memory-storage system is used to store a key, complete protection of the key is difficult to implement or sometimes unsatisfactory. For this reason, it is desirable to refrain from storing secret keys as comprehensively as possible.

One method that dispenses with the storage of secret keys is based on the use of so-called "physically unclonable functions," which are also called PUFs for short. Such PUFs are hardware structures in a semiconductor that serve to enable a unique identification of the semiconductor and thus secure keys for the cryptographic methods therefrom. Accordingly, a PUF represents a unique individual characteristic that is bound to a physical object, such as a device for signing, encrypting or decrypting for example.

Accordingly, physical characteristics of a component, such as a semiconductor, can be used to generate a secret key only when it is needed. For example, a charge degradation curve of a capacitor is recorded and starting values are extracted from the chronological sequence of the charge degradation to generate a complex key. Alternatively, the charge degradation curve, converted into digital information, such as a sequence of bits, can also be used as a key itself. Thereby, the use of a PUF makes it possible to dispense with the need to save the key, as it can be deleted immediately after use and be regenerated at any time.

However, when using a PUF, it is important to note that states of physical characteristics of hardware structures usually change over time. Physical characteristics used, such as a switch-on state of a component to generate a key, can therefore be altered by ageing of the component or by high-altitude radiation.

Thus, after a certain period of time, a device that uses a pre-selected hardware structure to generate a key generates keys that differ from the keys originally generated with the same hardware structure. If such a deviation occurs, the key generated from the hardware structure changes, and a decryption of data that were encrypted using a key generated prior to the hardware structure being changed is no longer possible after a change in the hardware structure has taken place.

In addition, the change of a hardware structure's physical characteristic during a transition period is partially non-deterministic. Switching between an old key and a new key is therefore difficult to predict, and there may even be a switch back from a new key to an old key during the transition period. Unambiguous encryption or decryption, unambiguous generation or verification of a signature is then no longer possible.

BRIEF SUMMARY

Some embodiments are therefore based on the problem of meeting the problems of prior art. In particular, a way is to find a way to deterministically generate a key as often as desired in order to avoid long-term storage, at least for as long a period of time as possible. In any case, an alternative to what is known from prior art is to be found.

Accordingly, an embodiment relates to a method for generating at least one cryptographic key that can be used to digitally sign, encrypt or decrypt data. For example, the cryptographic key corresponds to a sequence of bits, preferably with a predefined length.

According to an embodiment, the method is used to generate at least one cryptographic key with a device. For example, a cryptographic key corresponds to a string, such as a string of bits for example, preferably with a predefined length, or a range of characters. A cryptographic key can also correspond to a number.

Initially, the method involves taking a plurality of images with an image sensor. The image sensor corresponds to a device for electronically capturing two-dimensional images composed of light. The image sensor is preferably a semiconductor-based image sensor.

An example of an image sensor is a silicon sensor, such as a CCD image sensor for example. CCD image sensors are light-sensitive electronic components based on the internal photo effect. CCD image sensors comprise a CCD array. In accordance with one embodiment, the image sensor is an active pixel sensor, also called an APS, which corresponds to a semiconductor detector for light measurement. The active pixel sensor is also referred to as a CMOS sensor or CMOS image sensor, as it is manufactured using CMOS technology. Another example of an image sensor is a passive pixel sensor, also known as a PPS sensor or PPS image sensor.

Accordingly, a plurality of images are captured using the image sensor, wherein capturing preferably comprises the acquisition of sensor values of a plurality of or all of the pixels of the image sensors and the storage of these sensor values. For example, the sensor values of each pixel along with the position of each pixel of each image are stored in a file, so capturing a plurality of images comprises providing a plurality of files, each comprising the sensor values of the image associated with the file.

In the next step, pixels of the image sensor are captured depending on the captured images, which comprise a predefined error. This takes into account either all pixels of the image sensor or at least the pixels of the image sensor in one or a plurality of sections or in one or a plurality of areas of the image sensor. For example, the sections or areas are predefined or pre-selected.

In addition, a cryptographic key is determined depending on the captured pixels that comprise the error.

According to an embodiment, the predefined error corresponds to a random telegraph noise error, also known as an RTN error. This means that a plurality of or all of the image sensor pixels, or a plurality of or all of the pixels in the area(s) that comprise an RTN error, are identified. The identified pixels are hereinafter also referred to as defective pixels.

An RTN error is also known as burst noise or burst noise. Burst-noise errors are generally known, e.g., from "The Art of Electronics," by Paul Horowitz and Winfield Hill, Third Edition, Chapter 8.1.4, p. 477. For example, an RTN error in an image sensor corresponds to electronic noise that occurs in semiconductors and thin gate-oxide layers. An RTN error is also known as popcorn noise, impulse noise, bistable noise, or random telegraph signal noise (RTS noise).

For example, an RTN error of a pixel consists of sudden step-like transitions between two or a plurality of discrete voltage or current levels that occur randomly at unpredictable times. A shift in an offset voltage or current sometimes takes a plurality of milliseconds to seconds and then suddenly subsides again.

The cause of RTN failures can comprise the random capture and release of charge carriers at thin-film interfaces or at defective areas in the semiconductor crystal. The defects can be caused by manufacturing processes, such as heavy ion implantation, or by unintended side effects, such as surface contamination for example.

An embodiment is based on the knowledge that, following a manufacturing process, random telegraph noise errors occur continuously, i.e., steadily, either in a pixel or not. The occurrence of the error in a pixel that is subject to an RTN error cannot be determined exactly deterministically over time but occurs in a predictable time with stochastic distribution. Therefore, it is possible to clearly distinguish whether a pixel has such an error or not. This distinction between pixels that have the error and pixels that do not have the error is almost continuously stable over a long period of time.

Accordingly, it was recognized that a distribution of pixels with an RTN error via an array of the image sensor in an image sensor is a stable distribution on the one hand and a random distribution on the other hand. Furthermore, it was recognized that the determination of these defective pixels forms a reliable basis for determining a cryptographic key. The occurrence of the defective pixels can therefore preferably be used as a so-called physically unclonable function, which is also abbreviated as PUF.

The method thus provides the determination of a unique cryptographic key that can be generated essentially identically continuously. The key is also individually tied to a single hardware structure.

In accordance with a first embodiment of the method, a distribution and/or behavior of the captured pixels that comprise the error is determined. For example, a distribution corresponds to observing the positions of the defective pixels within at least the section or area of the image sensor, namely within the section or area of the array of pixels. Furthermore, it is also possible to observe the behavior of defective pixels in at least one section or area of the image sensor. The behavior corresponds, for example, to a chronological sequence of measured voltage or current values in the case of defective transitions of the states of the pixels or the time it takes for the transitions to subside, which are characteristic of RTN errors. A consideration of the probability of the occurrence of such transitions of defective pixels can also be deemed a basis, namely as behavior.

In particular, the behavior corresponds to a temporal behavior of a physical characteristic of the defective pixel. For example, the temporal behavior of each pixel or at least each pixel in the area or section can be determined with one or a plurality of histograms. One or a plurality of histograms can be determined using the images captured in succession. Preferably, therefore, the times of the recordings of each of the images are stored together with the image for the purpose of determining the behavior of the defective pixels, or the histogram(s) are generated directly depending on the points in time.

Furthermore, the cryptographic key is determined depending on the distribution and/or behavior.

By capturing a plurality of images and evaluating the pixels to determine the RTN errors, it is possible to determine all defective pixels in the section or area of the image sensor or across the entire image sensor in order to capture a starting value for determining a key depending on the distribution. In particular, the temporal behavior can be taken into account by taking a plurality of images, particularly at predefined time intervals so that this temporal behavior can also be used to determine a string as a basis for determining a cryptographic key.

Accordingly, a string or a range of characters can also be generated from the behavior and/or the progression by applying an expectation-maximization algorithm, which determines a characteristic of the random behavior of one or a plurality of defective pixels. Examples of such algorithms are the Hidden Markov method or the K-means method. From such a characteristic, numerical values are determined, which can be further processed as a string. Alternatively, one or a plurality of numbers or values can also be determined from the above-mentioned temporal histogram by counting values, e.g., peak values, which can be converted into a string.

The string is then used to generate cryptographic keys, for example, with the aid of a function that corresponds to an OpenSSL algorithm, for example.

The distribution and/or behavior are stable due to the characteristics of RTN errors so that the cryptographic key can be re-determined in the same way by the method if necessary.

In accordance with another embodiment, the method also comprises receiving a password. For example, receiving the password corresponds to receiving a password from a user interface of a device that carries out the method. A user has the option of entering a password via the user interface.

In accordance with a first further embodiment, depending on the password, the section(s) or the area(s) are then selected to capture the defective pixels. In addition, or as an alternative, in accordance with a second further embodiment, depending on the password, a function is determined with which a string or a range of characters is determined from the distribution or behavior to generate the cryptographic key from it. A string can be a number or a string of bits. A range of characters can correspond to a matrix or an imaginary range of numbers. The string or range of characters corresponds to a representation of the distribution or behavior of the defective pixels in the section(s) or range(s).

In addition, or as an alternative, in accordance with a third further embodiment, depending on the password, another function is selected to determine a cryptographic key from the string or range of characters, wherein the string or range of characters is generated depending on the distribution or behavior of the defective pixels.

According to this, a password, namely as a string of characters for example, is specified by a user. This can be done by typing from a user immediately before carrying out the method. Alternatively, the password can also be stored in a memory-storage system that, for example, can only be read and/or written by a specific user or group of users and by assigned access rights. The password is then used to select specific areas or functions to generate the cryptographic key.

In other words, the cryptographic key is generated in accordance with an embodiment depending on a received password.

This makes it possible for a cryptographic key to be regenerated only if a password is known, thereby being identical to a device that comprises the image sensor. Particularly when the device is passed on, a unique key can be generated individually for different users. It also ensures that a person who has unauthorized access to a device with the image sensor, but has no knowledge of the password, cannot misuse the private key that a previous user used, for example, to encrypt or digitally sign data.

In accordance with another embodiment, the specific distribution and/or behavior of the defective pixels is corrected or adjusted before the cryptographic key is determined. The cryptographic key is therefore determined depending on the corrected or adjusted distribution and/or the corrected or adjusted behavior.

In particular, when considering the behavior of defective pixels, for example, when taking into account the voltage values or current values during the transition to a defective state, this behavior is dependent on other circumstances of the capture of the images. These other circumstances can be captured, for example, by the correct pixels, i.e., the pixels that are not defective. In this way, the behavior to eliminate the influence of further circumstances can be normalized.

Preferably, a correction or adjustment is made as part of the function that determines a string or range of characters from the distribution or behavior to determine the cryptographic key.

In accordance with an embodiment, the correction or adjustment is carried out depending on a temperature. For example, the temperature can correspond to an outside temperature of a device with the image sensor. The temperature can be measured, for example, with a temperature sensor of the device. The temperature can also correspond to a sensor temperature of the image sensor, which is determined with a temperature sensor of the image sensor.

Furthermore, correction or adjustment is carried out in addition or as an alternative depending on a recording parameter. For example, the recording parameter is a gain factor that was chosen for the sensor values of the pixels when the images were captured.

By correcting or adjusting the distribution or behavior, it is ensured that any behavior of the defective or erroneous pixels changed by external influences or parameters of the image sensor is taken into account when generating the cryptographic key.

In accordance with another embodiment, the method also comprises receiving image data pertaining to an image comprising an object from the image sensor. Furthermore, the method comprises the generation of a digital signature with the cryptographic key or with a key derived from the cryptographic key, which corresponds, in particular, to a particularly own private key. The signature is generated with the cryptographic key or the key derived from the cryptographic key depending on the image data. In addition, the image data and the digital signature are provided.

Preferably, it is possible not to digitally sign the complete image data with the cryptographic key or the key derived from the cryptographic key but first to form a hash with a predefined hash function from the image data and digitally sign this hash.

The cryptographic key, which is generated from the defective pixels of the image sensor, can thus be used directly to digitally sign such images in a device that encompasses the image sensor and with which images can be captured. For example, with a public key that is generated and distributed to the cryptographic key or to the key derived from the cryptographic key, the signature can be verified.

In accordance with another embodiment, the image data of the captured image is stored in an image file and the digital signature is integrated into additional data, in particular, metadata, of the image file. The provision of the image data and the digital signature is therefore equivalent to the provision of the image file.

This allows the image file to be transmitted and managed as a single file in familiar ways. This makes it possible to exchange the signed image data in a simple and standardized way.

In accordance with another embodiment, the method also comprises the capture of a barcode, in particular, a two-dimensional barcode, such as a QR code, with a third-party public key in the image data. The method preferably involves storing the image data with the barcode in the device. It is preferable not to check the correctness of the third-party public key contained in the barcode. However, in accordance with an alternative embodiment, it can also be provided to match the third-party public key with a database, for example, to check whether the third-party key exists and/or is associated with a person.

Thus, it is possible to authenticate an object based on the image data with the digital signature by the device. Encryption with the cryptographic key or the key derived from the cryptographic key provides a piece of information, namely the signature so that the device or a user of the device recognizes the received image data as trustworthy. Characteristics of an object that can be seen in the image of the image data are thus confirmed by the user and/or the device.

In accordance with another embodiment, the barcode contains additional information in addition to the third-party public key. In addition to the third-party public key, other data can be extracted from the barcode, which is referred to as additional information. The additional information comprises data that, in accordance with a specific embodiment, indicates a current time or date, preferably on which the barcode is displayed.

In accordance with another further embodiment, the data of the barcode indicates information about the device that displays the barcode. Such information about the device can be, in particular, information about a camera, such as a serial number or designation of the device.

In accordance with another further embodiment, the data gives information about a user of the device. Such information about a user of the device may comprise, for example, a user's name or similar other identifiers of the user. In this case, the user preferably corresponds to the person to whom an asymmetric key pair of the device displaying the barcode is assigned.

Depending on the embodiment or one or a plurality of the further embodiments, the additional information is extracted from the image data with the device. Accordingly, the device is set up to extract not only the third-party public key but also other information, namely the additional information, from the barcode of the image data. This additional information can also be stored as plain text, metadata or in any other way in order to authenticate not only the content of the image, i.e., the object, with a specific state, but also to indicate the people involved in the authentication, a device used for authentication, or a time when the characteristics of the object to be authenticated existed.

In accordance with another embodiment, the digital signature is generated depending on the additional information extracted. The digital signature is therefore generated depending on the image data as well as the additional information. For example, the signature not only confirms the image data with the object, but also the additional information, such as when the image was taken for example.

Accordingly, not only the characteristics of the object that can be displayed in the image can be authenticated with the method. In addition, it is also possible to clearly determine, for example, at what point in time the object was authenticated and/or who was involved in this authentication by signing the additional data.

In accordance with another embodiment, the digital signature corresponds to an image signature. The image signature corresponds to an encryption of the received image data with the particularly own private key. Accordingly, only the image data of the image containing the object and the third-party public key are signed. For example, a hash is generated from the image data and this hash is encrypted with the private key, i.e., digitally signed. Since the image data contains the barcode with further information, the authenticity of the barcode data can also be inferred by determining the authenticity of the image data with the signature. The other information, such as the third-party public key and/or the additional information, can also be extracted from the image data at a time after digitally signing. A signature can therefore be executed with the device with low complexity.

In accordance with another embodiment, the digital signature comprises an image signature and a key signature. The image signature is generated by encrypting the received image data with the particularly own private key. Accordingly, as with the aforementioned embodiment, for example, a hash of the image data is formed, and this hash is encrypted with the particularly own private key in order to generate the image signature. Furthermore, the third-party public key and preferably also the additional information specified in the barcode of the image file is also encrypted with the particularly own private key in order to generate a key signature. Accordingly, the third-party public key is extracted from the image data beforehand.

Both signatures, namely the image signature and the key signature, can thus be verified separately by a recipient who receives the provided image data and the digital signature. Preferably, the recipient does not have to extract the public key from the image data.

In accordance with another embodiment, the signature corresponds to a combination signature. The combination signature is characterized in that the image data, the third-party public key contained in the barcode of the image data, and preferably also additional information contained in the barcode, are first combined with each other and then the combined data is encrypted, i.e., digitally signed, with the particularly own private key.

A combination of the image data with the third-party public key and preferably the additional information can be matched, for example, by simply arranging the corresponding data sequentially and forming an overall hash over all data. This further increases the security of the signature.

In accordance with another embodiment, the method involves displaying a particularly own barcode with a particularly own public key in a display of the device. Accordingly, the device is also designed to provide the particularly own public key itself as a barcode in order to carry out the steps described above for authenticating an object with another or further device, which can also be referred to as a third-party device. In particular, the barcode is provided after the image data with the object and the digital signature has been provided. This makes it possible to photograph and digitally sign the image data with two devices. Preferably, the particularly own barcode also comprises additional information. This additional information corresponds to the additional information referred to above, namely, in particular, a current time or date on which the barcode is displayed, information about the device or information about a user of the device.

In accordance with another embodiment, two devices that correspond, for example, to mobile devices, such as a mobile phone or a tablet for example, and comprise a front-facing camera, can simultaneously display a barcode and record the barcode of the other device and other image content, such as the faces of the respective users for example. For this purpose, the method in accordance with an embodiment relates to the fact that, after the barcode has been displayed by one device, a synchronization signal from another device is waited for. After receiving the synchronization signal, the received image data is stored in order to digitally sign them.

The synchronization signal preferably indicates that the other device has detected a particularly own barcode. Preferably, the device, which can also be referred to as a particularly own device, also sends another synchronization signal to the other device as soon as a particularly own device has captured the barcode of the other device or stored the image data received. In the example mentioned above, for example, in which the mobile devices with their front cameras have captured each other's barcodes, the synchronization signal and preferably the further synchronization signal can then generate image data at the same points in time that signing can occur. For example, two people, one of whom is holding their particularly own device, and the other person is holding another device next to their face, can verify each other for example. Corresponding points in time in additional information of the respective barcodes can confirm the synchronization or simultaneous recording of the image data.

In accordance with another embodiment, the method comprises the receipt of third-party image data and a third-party digital signature, in particular, as a file, which is referred to here as a third-party image file. For example, a third-party image file corresponds to an image file that contains image data taken by another device, i.e., a third-party device that does not correspond to a particularly own device. The image file corresponding to the third-party image file also comprises a digital signature, which also originates from the other device and is preferably comprised in the metadata of the third-party image file.

In addition, it is checked whether the received third-party image data contains an image with a barcode. Furthermore, it is also checked whether the barcode contains the particularly own public key. In addition, the third-party image data and the third-party digital signature, particularly in the event that the previous checks were successful, i.e., the third-party image data comprises a barcode, and the barcode comprises the user's own public key, are stored in a database that corresponds, for example, to a memory-storage system.

In accordance with another embodiment, the database in which the third-party image data and the third-party digital signature are stored is a publicly accessible database to which unrestricted data access is possible.

In accordance with another embodiment, the database is stored on a remote computer. Alternatively, the database is a local database, namely in a memory-storage system of the device or the other device. Thus, if the database is a database that resides locally on the device, corresponding image data and signatures can be retrieved at any point in time, i.e., on demand.

In accordance with another embodiment, the database comprises an identifier to assess the trustworthiness of the image data and the digital signature. The identifier is preferably generated depending on the image data and digital signature provided in the database. The identifier is therefore used to give other people who take the image data and the digital signature from a database an additional indication of how reliable the authentication is. This can be done, for example, depending on a set of image data and digital signatures that can be assigned to a specific person. For example, the more authentications a person has carried out, the more trustworthy that person can be evaluated for example. In particular, such assessments of trustworthiness can also be made on the basis of the standards set out in a so-called "Web of Trust." For example, depending on the status of the user of the database, identifiers can be provided to the user for the trustworthiness of the user and thus for the trustworthiness of the image data and signatures.

In accordance with another embodiment, the method involves providing the cryptographic key or a private key derived from the cryptographic key with an interface, in particular, a software interface.

By providing the cryptographic key, an application or software that was used to generate the cryptographic key from the RTN errors of the image sensor can provide the cryptographic key for use in other applications or programs.

Further, an embodiment relates to a computer program product comprising instructions which, when executed on a device, in particular, a mobile device, cause the device to carry out the method according to one of the aforementioned embodiments.

In addition, an embodiment relates to a device with a memory-storage system and a processor, wherein the device, in particular, by means of a computer program product as described herein, is set up to carry out the method in accordance with one of the aforementioned embodiments.

In accordance with another embodiment, the device corresponds to a mobile device, in particular, a mobile phone, a portable computer or a tablet computer. In addition, the device comprises a camera with an image sensor for recording image data and, preferably, a wireless interface.

Further, an embodiment comprises a system with a plurality of devices in accordance with one of the aforementioned embodiments. In addition, the system preferably comprises a database in a memory-storage system of a remote computer. The remote computer and each of the devices are set up to communicate with each other via a wireless interface of the device.

BRIEF DESCRIPTION OF THE SEVERAL VIEWS OF THE DRAWINGS

Further embodiments emerge from the embodiments explained in more detail in the figures.

DETAILED DESCRIPTION

Figure 1:
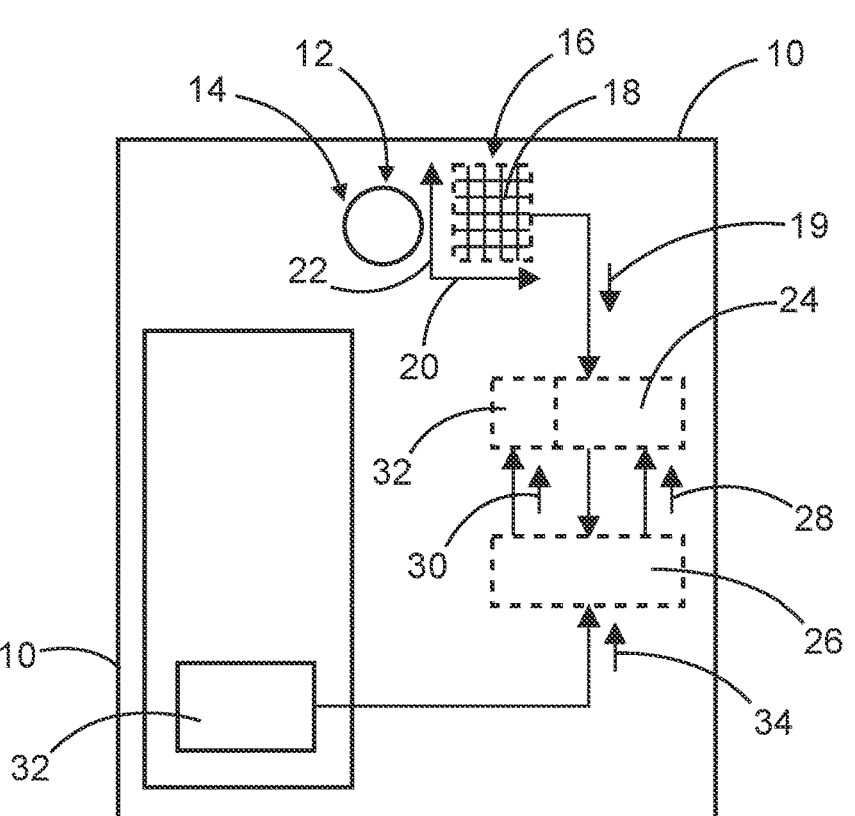
FIG. 1 shows a device in accordance with a first embodiment.

FIG. 1 shows a device 10 in accordance with an embodiment. Device 10 comprises a camera 12 with a lens 14, behind which an image sensor 16 is arranged. The image sensor 16 is a semiconductor sensor, such as a CMOS image sensor for example. The image sensor 16 comprises a plurality of pixels 18 arranged in the form of an array or matrix. Thus, in an X-direction 20 of the image sensor 16, pixels 18 are arranged in a plurality of columns. In a Y-direction 22, the pixels 18 are arranged in rows. One or a plurality of images captured using the camera 12 can be stored in a memory-storage system 24.

In order to capture pixels 18 that have a predefined error, namely a random telegraph noise error, captured images 19 can be read from memory-storage system 24 by a processor 26, and the defective pixels 28 can be identified by an algorithm from the captured images 19. The processor 26 is also set up to determine a cryptographic key 30 depending on the position of the defective pixels 28, for example, depending on their distribution, and/or depending on the behavior of the defective pixels 28. The processor 26 is therefore also set up to identify the distribution or behavior of the defective pixels 28.

The cryptographic key 30 can then be stored either in memory-storage system 24 or in another secure memory-storage system 32. Preferably, cryptographic key 30 is stored in secure storage 32 only for as long as it is needed by an application. Preferably, the device 10 comprises an input device 32 with which a user can specify a password 34. The password 34 can be used to control processor 26, for example, to select an algorithm, namely a function, which determines the cryptographic key 30 depending on the defective pixels 28.

Figure 2:
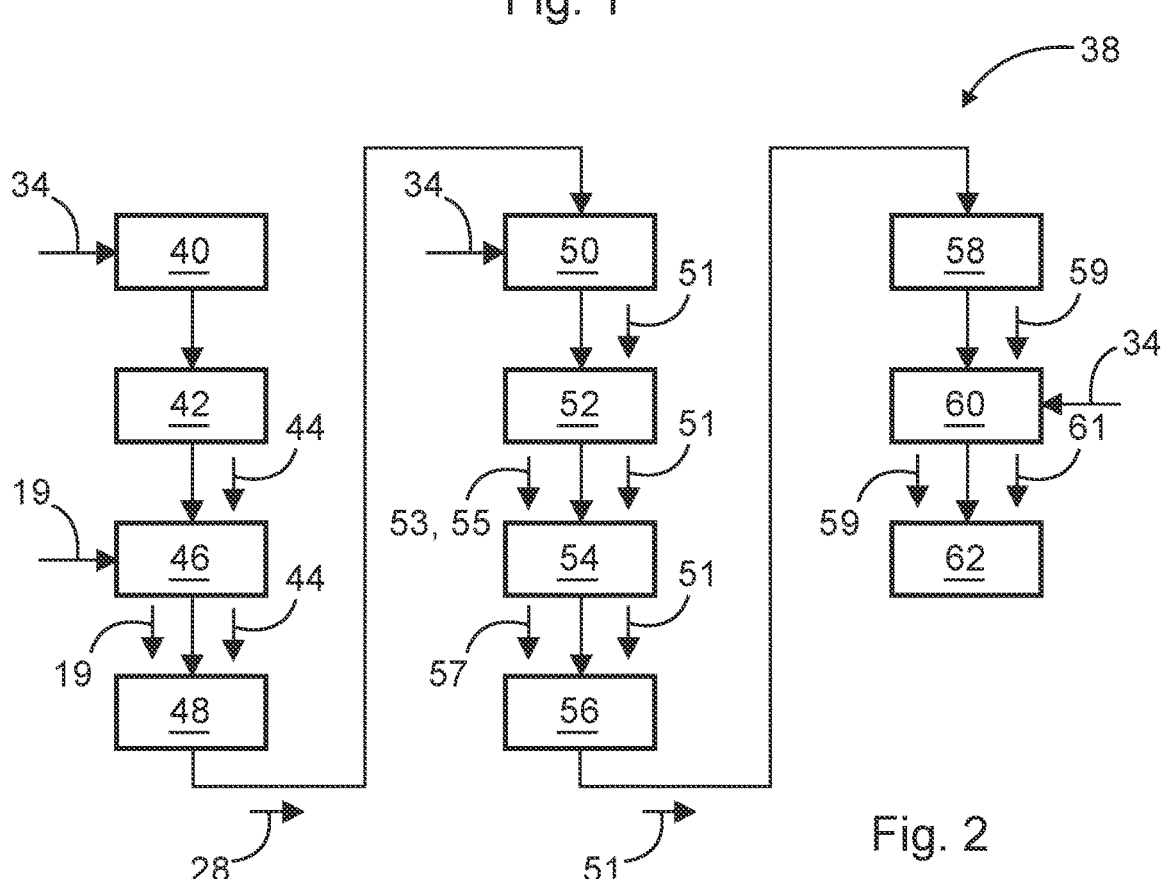
FIG. 2 shows a method in accordance with a first embodiment.

FIG. 2 shows the steps of a method 38 in accordance with an embodiment. In a step 40, a password 34 is received by an input medium 32 of a device. At step 42, an area 44 of the image sensor 16 is selected, and at step 46, a plurality of images 19 are captured using the image sensor 16. At step 48, captured defective pixels 28 are determined in the selected area 44. At step 50, a function 51 is selected depending on the password 34, wherein the function 51 specifies how a cryptographic key is determined from a behavior or distribution of the defective pixels 28.

At step 52, the behavior 53 or distribution 55 is determined depending on the defective pixels 28. At step 54, recording parameters 57 are determined, such as a sensor temperature for example, and at step 56, the behavior or distribution is corrected depending on the recording parameters. At step 58, depending on function 51, a string 59 is obtained from parameters that describe the behavior or distribution. At step 60, another function 61 is selected depending on the password 34 and at step 62 a cryptographic key 30 is determined from the string with the further function 61.

Figure 3:
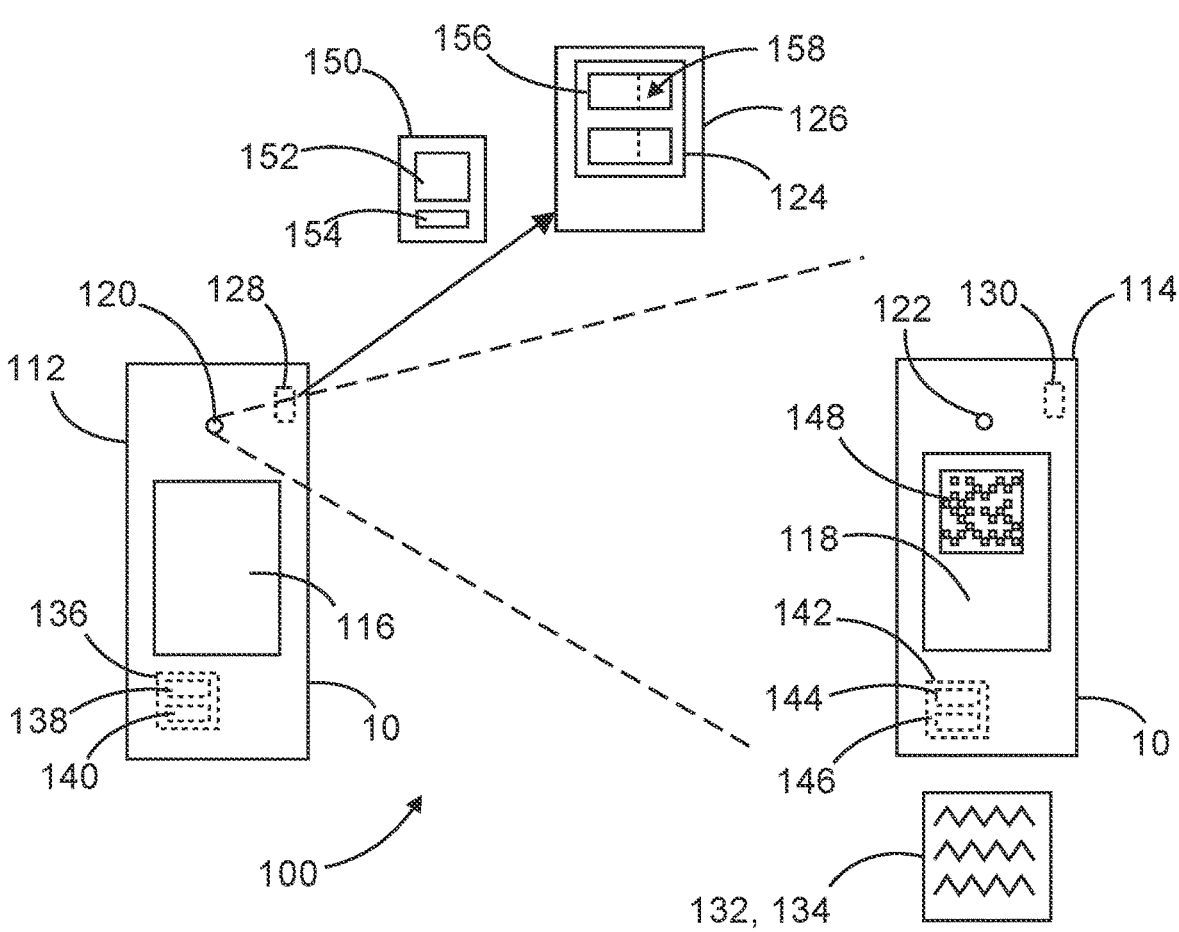
FIG. 3 shows a system in accordance with an embodiment.

FIG. 3 shows a system 100 in accordance with an embodiment comprising a plurality of devices 10, 112, 114, wherein each of the devices 10, 112, 114 is set up to carry out method 38 in accordance with an embodiment.

Device 112 and device 114 each comprise a display 116, 118 and a camera 120, 122. In addition, a database 124 is displayed in a remote computer 126. Devices 112 and 114 also each comprise a wireless interface 128 and 130 in order to exchange data wirelessly, i.e., wirelessly, with the remote computer 126. The wireless interfaces 128, 130 can also be used to exchange data between devices 112, 114. In addition, an object 132 is depicted, which corresponds to a document 134.

Device 112, which is referred to here as a separate device, also comprises a memory-storage system 136. Device 112 stores a particularly own private key 138 and a particularly own public key 140 in memory-storage system 24, 32, 136. If the other device 114 is described as another device or a third-party device, then a private key and a public key are also stored in a memory-storage system 24, 32, 142, which is also contained in the other device 114, which are referred to here as third-party private key 144 and as a third-party public key 146. The displays 116, 118 are set up to represent a barcode 148.

In FIG. 3, the object 132 is first authenticated by the particularly own device 112. For this purpose, a barcode 148 is displayed with the display 118 of the other device 114. Device 112 uses camera 120 to take a photograph showing the object 132 and the barcode 148. The device 112 then generates a digital signature with the particularly own private key 138 depending on the image data generated by the camera 120. An image file 150, which contains image data 152 and the signature 154, is then transferred to database 124 and stored in database 124 as an entry 156. The entry 156 is assigned an identifier 158, which indicates the trustworthiness of the entry 156.

In order to increase the trustworthiness of the authentication of the object by means of the image file 150, the positions of devices 112, 114 can be swapped in a subsequent step shown in FIG. 3. The other device 114 then takes up a representation of the object 132 and of the device 112, which displays a barcode comprising the public key 140 of device 112.

Alternatively, instead of the object 132, which, in this case, corresponds to a document 134, a mutual authentication of second people can also take place, each holding devices 112, 114, for example, next to their faces, and taking a photo of the other device 112, 114 and of the face of the person assigned to the device using the devices 112, 114. The signed image data of devices 112, 114 are then transferred to the database 124 for example.

Figure 4:
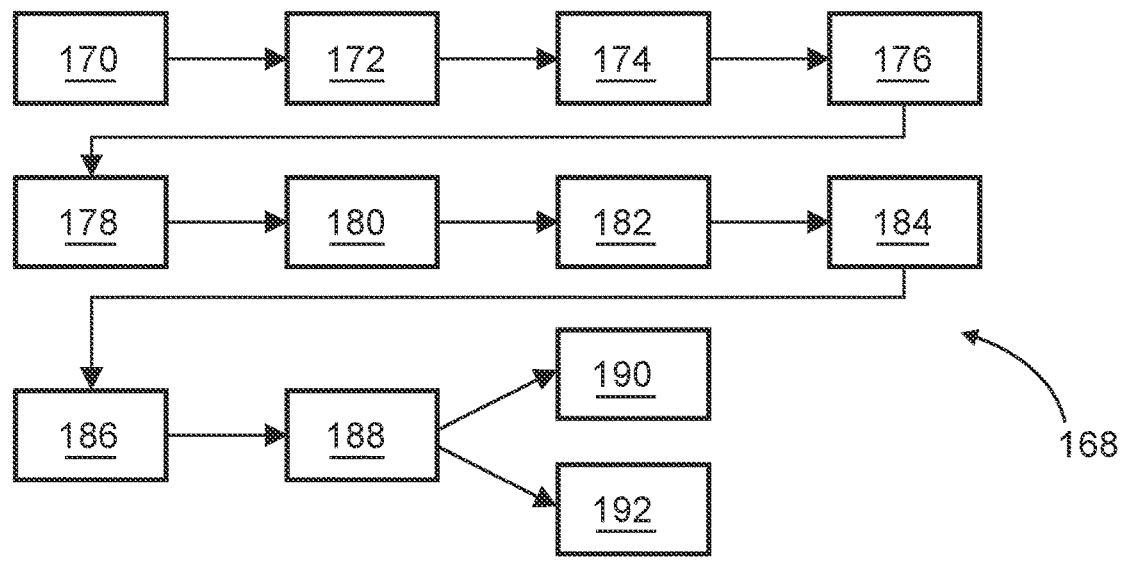
FIG. 4 shows another embodiment of the method.

FIG. 4 explains the steps of a method 168 in accordance with another embodiment. At step 170, a barcode 148 is displayed with a device 114, which can be described as a third-party device. At step 172, a trigger signal is received by a device 112, which can also be referred to as a particularly own device. At step 174, an image is captured showing the barcode 148 displayed with the third-party device 114. An image sensor that captured the image receives image data 152 at step 176 and the barcode 148 in image data 152 at step 178. At step 180, a third-party public key 146 in barcode 148 is recognized, and additional information is entered at step 182. At step 184, the collected data is stored. The storing preferably corresponds to caching for further processing of the image data 152. At step 186, a signature 154 is then generated with the particularly own private key 138, which corresponds to cryptographic key 30 or is derived from the cryptographic key. At step 188, image data 152 and digital digitally signature 154 are provided. At step 190, the image data 152 and the digital signature 154 are stored in a database 124. Preferably, or alternatively, the provided image data 152 and the digital signature 154 are transferred to the third-party device 114 in a step 192.

REFERENCE LIST 10 device
12 camera
14 lens
16 image sensor
18 pixels
19 images
20 X-direction
22 Y-direction
24 memory-storage system
26 processor
28 defective pixels
30 cryptographic keys
32 further memory-storage system
34 password
38 method
40 receive password
42 selecting image sensor area
44 selected area
46 capturing a plurality of images with the image sensor
48 determining defective pixels
50 selecting function
51 function
52 determining behavior or distribution
53 behavior
54 determining recording parameters
55 distribution
56 correcting behavior or distribution
57 recording parameters
58 selecting a further function
59 string
60 transferring the distribution and/or behavior of the defective pixels to string or range of characters
61 further function
62 determining cryptographic keys 100 system
112 particularly own device
114 other device/third-party device
116 display of particularly own device
118 display of the additional device/third-party device
120 camera of particularly own device
122 camera of the other device/third-party device
124 database
126 remote computer
128 wireless interface of the particularly own device
130 further device/third-party wireless interface
132 object
134 document
136 memory-storage system
138 particularly own private key of particularly own device
140 particularly own public key of particularly own device
142 storage of the other device/third-party device
144 third-party private key of further device/third-party device
146 third-party public key of further device/third-party device
148 barcode
150 image file
152 image data
154 signature
156 entry
158 identifier
168 method
170 show barcode
172 receive trigger signal
174 capturing an image
176 receiving image data from image sensor
178 capturing barcode in image data
180 recognizing third-party public keys in barcodes
182 collecting additional information
184 storing the data collected
186 generating signature with your one's private key
188 providing image data and digital signature
190 storing image data and digital signature in a database
192 transferring image data and digital signature to the third-party device German patent application no. 102023108680.4, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for generating at least one cryptographic key, comprising:
capturing a plurality of images with an image sensor,
capturing pixels of the image sensor in at least one section or area of the image sensor that comprise a predefined error depending on the images captured,
determining a distribution and/or a behavior of the captured pixels that comprise the error, and
determining at least one cryptographic key depending on the captured pixels that comprise the error,
wherein:
the predefined error corresponds to a random telegraph noise error, and the determination of the at least one cryptographic key depending on the captured pixels that comprise the error includes the determination of at least one cryptographic key depending on the distribution and/or the behavior.

2. The method according to claim 1, wherein the method further comprises receiving a password, wherein, depending on the password, the following is determined or selected:
the section(s) or area(s) for capturing pixels that comprise the predefined error, and/or
a function that uses the distribution or behavior to determine a string of characters, or a range of characters, for determining the at least one cryptographic key, and/or
another function that determines the at least one cryptographic key from a string or range of characters generated depending on the distribution or behavior of the defective pixels.

3. The method according to claim 2, wherein the function uses the distribution or behavior to determine a number or a string of bits, or a matrix or an imaginary range of numbers.

4. The method according to claim 1, wherein the distribution and/or behavior is corrected or adjusted, and the at least one cryptographic key is determined depending on the corrected or adjusted distribution and/or the corrected or adjusted behavior.

5. The method according to claim 4, wherein the correction or adjustment is carried out depending on a temperature of the image sensor, and/or a recording parameter selected during the capturing of the pixels.

6. The method according to claim 5, wherein the recording parameter is a gain factor selected during the capturing of the pixels.

7. The method according to claim 1, further comprising:
receiving image data of an image comprising an object from the image sensor,
generating a digital signature with the at least one cryptographic key or with a key derived from the at least one cryptographic key, in particular, depending on the image data, and
providing the image data and the digital signature.

8. The method according to claim 7, wherein the image data are integrated into an image file and the digital signature is integrated into additional data of the image file, and the provision of the image data and the digital signature corresponds to provision of the image file.

9. The method according to claim 7, further comprising capturing a barcode with a third-party public key in the image data.

10. The method according to claim 1, wherein the method comprises displaying a particularly own barcode with a particularly own public key, wherein the particularly own barcode also comprises additional information, and wherein the particularly own public key is dependent on the at least one cryptographic key or corresponds to the at least one cryptographic key.

11. The method according to claim 10, further comprising:
receiving third-party image data and a third-party digital signature,
checking whether the received third-party image data contains an image with a QR code,
checking whether the QR code comprises the particularly own public key, and
storing the third-party image data and the third-party digital signature in a database.

12. The method according to claim 11, wherein the third-party image data and a third-party digital signature are received as a third-party image file.

13. The method according to claim 1, further comprising providing the at least one cryptographic key, with a software interface.

14. A non-transitory computer-readable medium having instructions stored thereon which, when executed on a device, cause the device to carry out the method according to claim 1.

15. A device comprising a memory-storage system and a processor, wherein the processor is configured by instructions stored on the memory-storage system to carry out the method according to claim 1.

16. The device according to claim 15, wherein the device is a mobile device, that further comprises a camera with an image sensor for recording image data.

17. A system comprising:

a plurality of devices according to claim 15, and a database in a memory-storage system of a remote computer, wherein the remote computer and each of the devices are configured to communicate with each other via a wireless interface of the device.

18. The method according to claim 1, wherein the image sensor is a CMOS image sensor.

19. The method according to claim 1, further comprising providing a private key derived from the at least one cryptographic key, with a software interface.

\*　　\*　　\*　　\*　　\*